(12) United States Patent
Brenner et al.

(10) Patent No.: US 8,855,967 B1
(45) Date of Patent: Oct. 7, 2014

(54) SURFACE DATA MEASUREMENT SYSTEM AND METHOD

(75) Inventors: Mark W. Brenner, Ida Grove, IA (US); Raymond J. Bumann, III, Ida Grove, IA (US)

(73) Assignee: GOMACO Corporation, Ida Grove, IA (US)

( * ) Notice: Subject to any disclaimer, the term of this patent is extended or adjusted under 35 U.S.C. 154(b) by 484 days.

(21) Appl. No.: 13/287,163

(22) Filed: Nov. 2, 2011

(51) Int. Cl.
*G06F 19/00* (2011.01)
*G01B 5/28* (2006.01)
*E01C 19/00* (2006.01)

(52) U.S. Cl.
CPC .............. *G01B 5/28* (2013.01); *E01C 19/006* (2013.01)
USPC ............... 702/150; 356/601; 404/75; 701/50; 702/155; 702/158

(58) Field of Classification Search
CPC ........ G01B 5/28; G01B 5/285; E01C 19/006; E01C 23/07; B60G 2400/82; B60G 2401/00
USPC ......... 702/149, 150, 155, 158, 159, 166, 170, 702/171, 175, 188; 33/533; 73/146; 356/601, 602; 367/96; 404/72, 84.1; 701/50
See application file for complete search history.

(56) References Cited

U.S. PATENT DOCUMENTS

| | | | |
|---|---|---|---|
| 5,774,374 A * | 6/1998 | Scott et al. ..................... | 702/155 |
| 6,452,684 B1 * | 9/2002 | Mennink ........................ | 356/601 |
| 7,044,680 B2 * | 5/2006 | Godbersen et al. ............. | 404/75 |
| 7,643,923 B2 * | 1/2010 | Buehlmann et al. ............ | 701/50 |

* cited by examiner

*Primary Examiner* — John H Le
(74) *Attorney, Agent, or Firm* — Suiter Swantz pc llo

(57) ABSTRACT

A surface measurement apparatus having at least one sensor and a reference point with pre-determined relative position relative to the sensor measures a distance between the sensor and a point on a surface over which the surface measurement apparatus is configured to travel. A receiver receives data related to a position of the reference point a calculated distance between the reference point and a position measurement station; and a processor calculates an absolute position of the point on the surface based on (a) the measured distance between the at least one sensor and the point, (b) the pre-determined relative position difference between the reference point and the at least one sensor, and (c) the position of the reference point or the calculated distance between the position measurement station and the reference point.

15 Claims, 3 Drawing Sheets

SURFACE DATA MEASUREMENT SYSTEM AND METHOD

FIELD

The present disclosure generally relates to the field of data gathering systems, and more particularly to a surface data measurement system and method for providing absolute positional data.

BACKGROUND

When planning a pavement project, such as a roadway construction project (e.g., gravel, asphalt, concrete, and the like), it may be desirable to obtain detailed surface data prior to introducing the paving material to a surface. For instance, a contractor on a roadway construction site may desire accurate, absolute positional data of the surface in order to prepare a subgrade for the roadway or to provide data of a surface to be resurfaced, in order to estimate an amount of paving material required for the pavement project, and the like. Further, the importance of pavement planning is becoming more evident as contractors realize that well-planned pavement operations are cost effective. Contractors desire to analyze the subgrade of the road surface and/or an existing road surface before the pavement of the road or resurfacing of the road is completed for various reasons. For example, contractors can save paving material, reduce the cost of concrete slabs, and reduce the cost of road surface modifications if they predict an overall estimated volume of paving material based on subgrade conditions.

However, the process of obtaining detailed surface data, including absolute positional data, often requires substantial time/labor associated with gathering the data. Moreover, the data that is obtained may include errors (e.g., human recording error) which would detract from the reliability of calculations which rely upon the positional data. Further, the data that may be obtained may not provide comprehensive data coverage of a surface, thereby providing an incomplete data record.

It is therefore desirable to provide a surface data measurement system and/or method to obtain detailed, reliable, and comprehensive surface data, including absolute positional data without the substantial time/labor associated with gathering the data provided by known manual methods.

SUMMARY

In one implementation of the present disclosure, a surface measurement apparatus comprises: at least one sensor for measuring a distance between the at least one sensor and a point on a surface over which the surface measurement apparatus is configured to travel; a reference point, the reference point having a pre-determined relative position difference on the surface measurement apparatus from the at least one sensor; a receiver for receiving data related to at least one of a position of the reference point measured by a position measurement station having pre-determined real world coordinates or a calculated distance between the reference point and the position measurement station; and a processor for calculating an absolute position of the point on the surface based on (a) the measured distance between the at least one sensor and the point, (b) the pre-determined relative position difference between the reference point and the at least one sensor, and (c) the at least one of the position of the reference point of the surface measurement apparatus or the calculated distance between the position measurement station and the reference point of the surface measurement apparatus.

In another implementation, a method for obtaining absolute positional information for a surface comprises: measuring a distance, via a sensor of a surface measurement apparatus, between the sensor of the surface measurement apparatus and a point on a surface over which the surface measurement apparatus is configured to travel; measuring a position of a reference point on the surface measurement apparatus via a position measurement station having pre-determined real world coordinates, the reference point having a pre-determined relative position difference on the surface measurement apparatus from the sensor; and deriving an absolute position of the point on the surface based on (a) the measured distance between the sensor and the point on the surface, (b) the pre-determined relative position difference between the reference point and the sensor, and (c) the measured position of the reference point on the surface measurement apparatus.

In a further implementation, a system comprises: a surface measurement apparatus, the surface measurement apparatus including: at least one sensor for measuring a distance between the at least one sensor and a point on a surface over which the surface measurement apparatus is configured to travel; and a reference point, the reference point having a pre-determined relative position difference on the surface measurement apparatus from the at least one sensor. The system further includes a position measurement station having pre-determined real world coordinates, the position measurement station including: a sensor configured to measure a position of the reference point of the surface measurement apparatus. The system further includes a processor for calculating an absolute position of the point on the surface based on (a) the measured distance between the at least one sensor and the point, (b) the pre-determined relative position difference between the reference point and the at least one sensor, and (c) the measured position of the reference point of the surface measurement apparatus.

It is to be understood that both the foregoing general description and the following detailed description are exemplary and explanatory only and are not necessarily restrictive of the disclosure as claimed. The accompanying drawings, which are incorporated in and constitute a part of the specification, illustrate an embodiment of the disclosure and together with the general description, serve to explain the principles of the disclosure.

BRIEF DESCRIPTION OF THE DRAWINGS

The numerous advantages of the present disclosure may be better understood by those skilled in the art by reference to the accompanying figures in which.

DETAILED DESCRIPTION

Reference will now be made in detail to the presently preferred embodiments of the present disclosure, examples of which are illustrated in the accompanying drawings.

Figure 1:
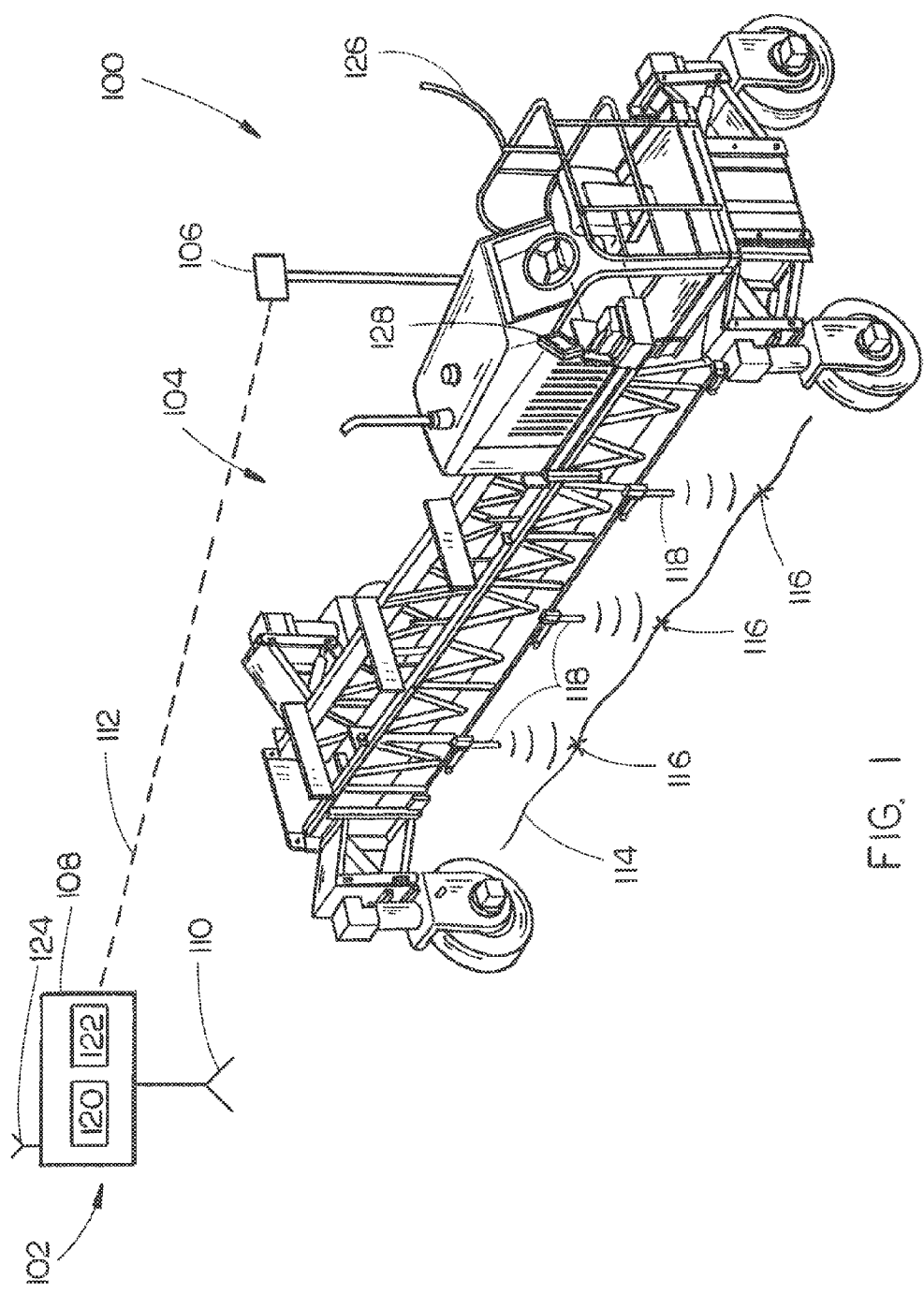
FIG. 1 is a schematic diagram of a surface data measurement system including a position measurement station and a surface measurement apparatus.

Referring now to FIG. 1, a schematic diagram of a surface data measurement system 100 is shown. System 100 generally includes a position measurement station 102 and a surface measurement apparatus 104. The position measurement station 102 includes a known/predetermined location and may be configured to measure a position of a reference point 106 on the surface measurement apparatus 104 relative to the position measurement station 102. The known/predetermined location of the position measurement station 102 may be acquired via current absolute positioning techniques, such as via Global Positioning System (GPS) data, survey data, and the like, or other suitable positioning techniques. In one implementation, the position measurement station 102 is a total station (i.e., a location position system) which utilizes a robotic tracking head 108 mounted on a stationary base 110. The robotic tracking head 108 sends a laser 112 to the reference point 106 (e.g., target) on the surface measurement apparatus 104 which is positioned on and/or traveling over a surface 114 on which surface data is to be acquired. The robotic tracking head 108 may track movement of the surface measurement apparatus 104 along surface 114 so as to gather a plurality of positions of the reference point 106 of the surface measurement apparatus 104 over time as the surface measurement apparatus 104 travels. The reference point 106 may be a prism or other device to reflect at least a portion of the laser 112 in order for the robotic tracking head 108 to measure the position of the reference point 106 of the surface measurement apparatus 104. While an implementation of system 100 has been described having a position measurement station 102 incorporating a laser 112, robotic tracking head 108, and prism, it is contemplated that position measurement station 102 may include other devices suitable for measuring a position of reference point 106 and/or the surface measurement apparatus 104, including, but not limited to, a camera and target, GPS receivers, sonic sensors, and/or other world coordinate sensor combinations.

The surface measurement apparatus 104 is generally configured to measure elevation/distance/position of a plurality of points 116 on the surface 114 from a plurality of sensors 118 positioned on the surface measurement apparatus 104. In one implementation, the sensors 118 are non-contact sonic sensors positioned above the surface 114. However, it is contemplated that the sensors 118 may be any sensor (e.g., contact or non-contact) sufficient to measure an elevation/distance/position between the sensors 118 and the points 116 on the surface 114. Such sensors may include, for example, sonic sensors, laser sensors, cameras, and the like. An exemplary surface measurement apparatus 104 may be disclosed in U.S. Pat. No. 7,044,680, entitled "Method and apparatus for calculating and is using the profile of a surface," which is incorporated in its entirety.

Each sensor of the plurality of sensors 118 is positioned at a known distance/position from the reference point 106 on the surface measurement apparatus 104, such that the reference point 106 has a known/pre-determined relative position difference (e.g., a 3-D position offset) from each sensor of the plurality of sensors 118. Thus, when a measurement is taken from a particular sensor, the distance/position difference between the point 116 on the surface 114 and the reference point 106 may be calculated by using the known distance/position difference between the sensor 118 and the reference point 106 and by using the measured elevation/distance/position between the sensor 118 and the point 116. In a particular implementation, the position of the plurality of sensors 118 may be adjusted to be nearer or farther from the surface 114, with the adjusted position being recorded so as to preserve a known distance/position difference between the reference point 106 and the sensor 118. An absolute position (e.g., real world coordinate (RWC)) may be determined for each point 116 via the calculated distance/position difference between the point 116 and the reference point 106 and the measured position of the reference point 106 of the surface measurement apparatus 104 (e.g., measured by the position measurement station 102, as described above). For instance, a processing unit (e.g., computer processor) on the surface measurement apparatus, on the position measurement station 102, or at a site remote from the system 100 may perform the absolute position calculations.

The position measurement station 102 may include one or more of a memory 120 and a communications interface 122 for storing or transmitting, respectively, the measured position of the reference point 106 of the surface measurement apparatus 104. In one implementation, the communications interface 122 interfaces with a transmitter 124 for transmitting the measured position to a receiver 126 on the surface measurement apparatus 104. In a particular implementation, the position measurement station 102 calculates a distance between the position measurement station 102 and the reference point 106 on the surface measurement apparatus 104 based on the measured position of the reference point 106 and the known location of the position measurement station 102. The position measurement station 102 may then transmit via the transmitter 124 the calculated distance and/or the measured position to the receiver 126 on the surface measurement apparatus 104.

The surface measurement apparatus 104 may include a display 128 to display data, including, but not limited to, the measured position of the reference point 106 of the surface measurement apparatus 104, the distance between the sensors 118 and the reference point 106, the measured distance between the sensors 118 and the points 116 on the surface 114, and the determined absolute position for each point 116. The display 128 may advantageously provide on-site data to personnel working with the position measurement station 102 and the surface measurement apparatus 104.

Figure 2:
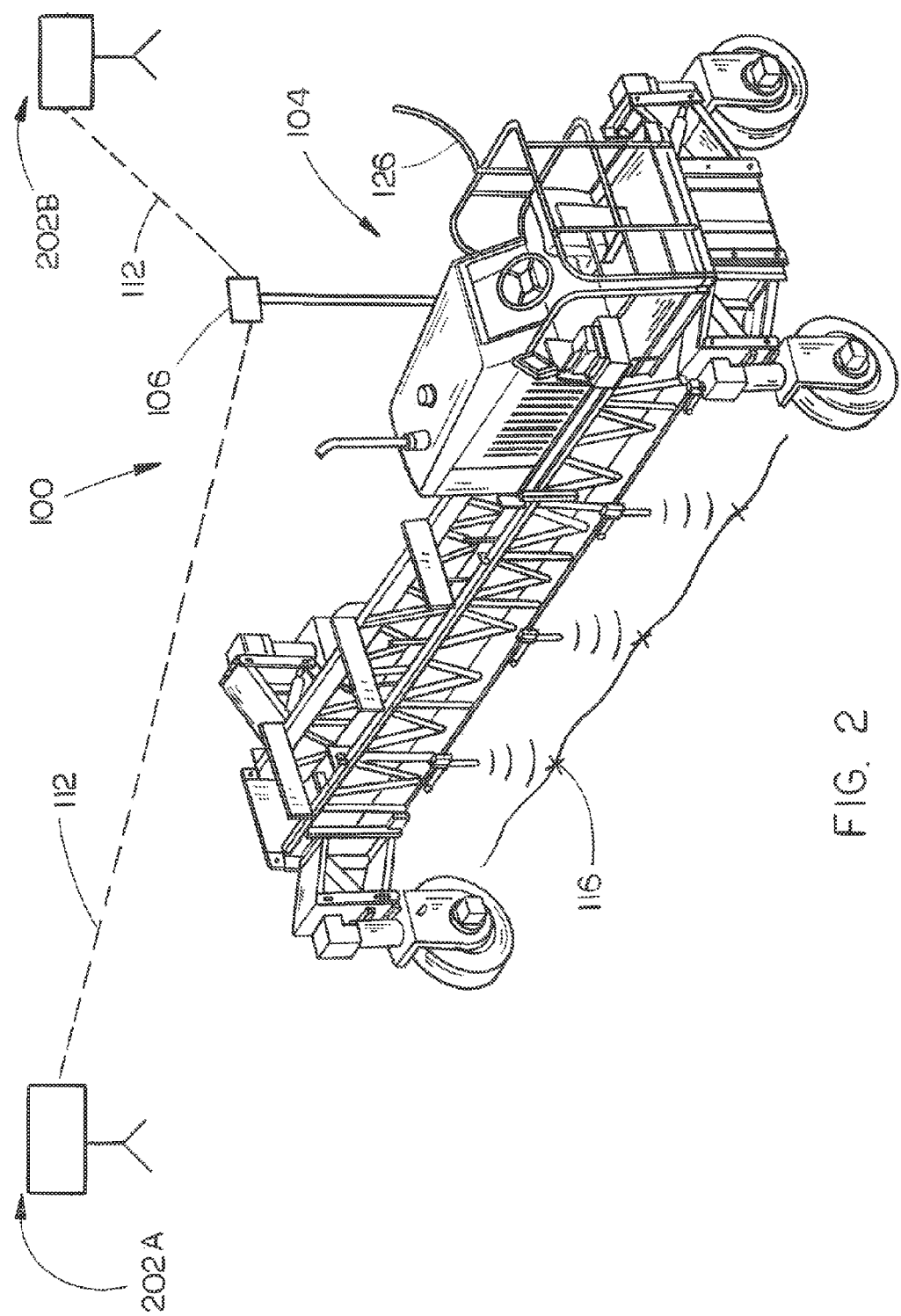
FIG. 2 is a schematic diagram of the surface data measurement system of FIG. 1 including a plurality of position measurement stations.

Referring now to FIG. 2, a schematic diagram of the surface data measurement system 100 is shown with a plurality of position measurement stations 202a, 202b. While a single position measurement station may be repositioned to continue gathering data while the surface measurement apparatus 104 proceeds in a direction of travel, multiple position measurement stations may be utilized to provide continuous data collection without the substantial interruption to the data gathering associated with the repositioning of the position measurement station 102 in the single station implementation. As shown in FIG. 2, the position measurement stations 202a and 202b may be spaced apart in the direction of travel of the surface measurement apparatus 104, such that, for example, position measurement station 202a gathers data while the surface measurement apparatus 104 is near the position measurement station 202a and position measurement station 202b gathers data while the surface measurement apparatus 104 is near the position measurement station 202b, upon further travel of the surface measurement apparatus 104. The amount of separation between position measurement stations 202a and 202b depends on a desired amount of data collection overlap between the position measurement stations 202a and 202b. In one implementation, the position measurement stations 202a and 202b are spaced between approximately 300 feet and 600 feet from each other. Overlap may be desirably minimized to avoid data collection redundancy and to maximize a distance covered by the position measurement stations 202a and 202b. However, some degree of overlap may be useful in confirming accuracy/precision of data collection between position measurement stations 202a and 202b.

In operation, position measurement station 202a gathers data of the position of the reference point 106 on the surface measurement apparatus 104 for a period of time while the surface measurement apparatus 104 proceeds along the surface 114 in the direction of travel as indicated by the arrow 204. Once the surface measurement apparatus 104 reaches a certain distance from position measurement station 202a (e.g., a maximum operating distance), a test may be performed by the position measurement station 202b to verify that the position measurement station 202b is able to gather accurate data. Such a test may include, for example, a comparison of absolute position data of the points 116 on the surface 114 derived from the data collected by the position measurement station 202a and from the data collected by the position measurement station 202b. If the derived absolute positions are within a desired tolerance, then confirmation of the accuracy of position measurement station 202b is verified. Once verified, the position measurement station 202b may proceed to measure the positional data of the surface measurement apparatus 104 and the position measurement station 202a may stop gathering positional data.

Figure 3:
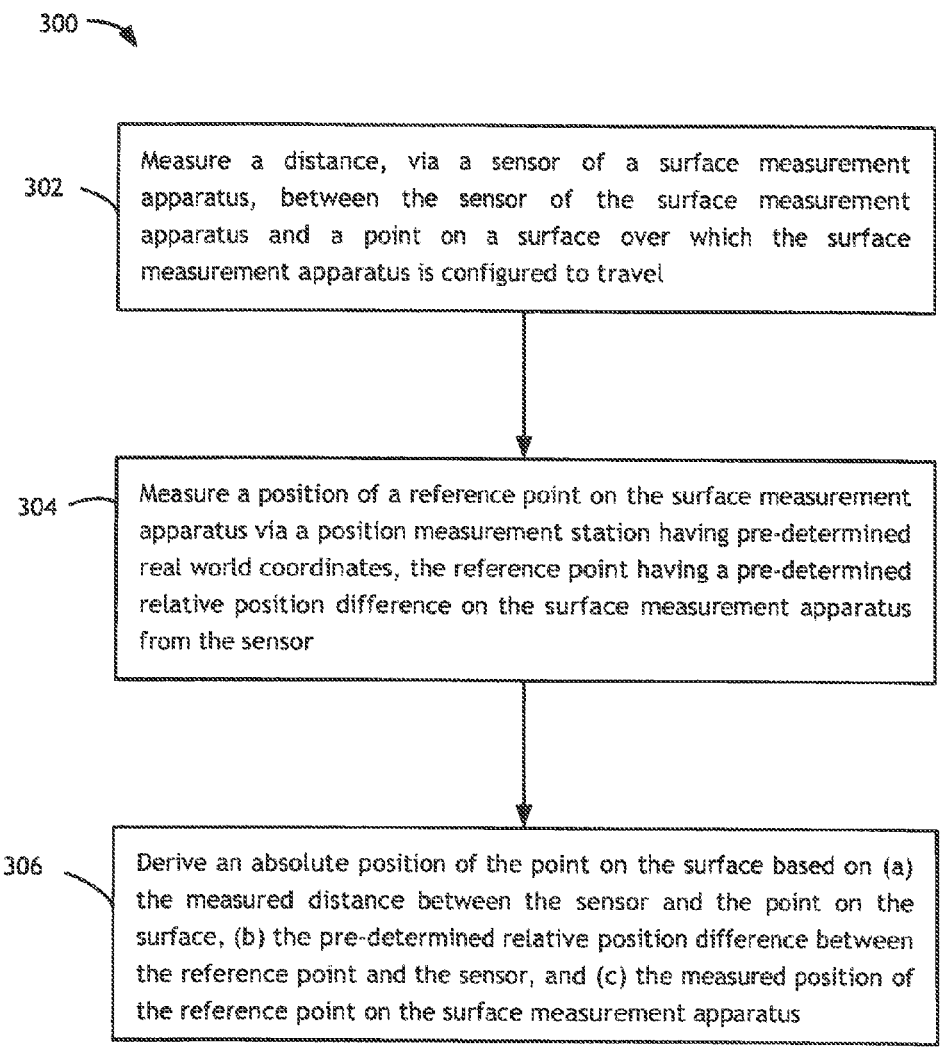
FIG. 3 is a flow diagram of a method for obtaining absolute positional information for a surface.

Referring now to FIG. 3, a flow diagram of a method 300 for obtaining absolute positional information for a surface is shown. Method 300 may include measuring a distance, via a sensor of a surface measurement apparatus, between the sensor of the surface measurement apparatus and a point on a surface over which the surface measurement apparatus is configured to travel, 302. In one implementation, the surface measurement apparatus 104 measures a distance between sensor 118 and a point 116 on surface 114. Method 300 may also include measuring a position of a reference point on the surface measurement apparatus via a position measurement station having pre-determined real world coordinates, the reference point having a pre-determined relative position difference on the surface measurement apparatus from the sensor, 304. In one implementation, the position of reference point 106 on the surface measurement apparatus 104 is measured by the position measurement station 102 which may have pre-determined real world coordinates, such as those determined by GPS or other suitable position measurement system. Method 300 may further include deriving an absolute position of the point on the surface based on (a) the measured distance between the sensor and the point on the surface, (b) the pre-determined relative position difference between the reference point and the sensor, and (c) the measured position of the reference point on the surface measurement apparatus, 306. In one implementation, a processing unit (e.g., computer processor) on the surface measurement apparatus, on the position measurement station 102, or at a site remote from the system 100 may perform the absolute position calculations to determine the real world coordinates of the point(s) 116 on surface 114.

It should be understood that while the method 300 is illustrated having a particular flow of operations, in some implementations, certain portions of the operations might be executed in a different order, where not otherwise specified, including concurrent execution of operations.

It is believed that the present disclosure and many of its attendant advantages will be understood by the foregoing description, and it will be apparent that various changes may be made in the form, construction and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. A surface measurement apparatus, comprising:
   at least one sensor for measuring a distance between the at least one sensor and a point on a surface over which the surface measurement apparatus is configured to travel;
   a reference point, the reference point having a pre-determined relative position difference on the surface measurement apparatus from the at least one sensor;
   a receiver for receiving data related to at least one of a position of the reference point measured by a position measurement station having pre-determined real world coordinates or a calculated distance between the reference point and the position measurement station; and
   a processor for calculating an absolute position of the point on the surface based on (a) the measured distance between the at least one sensor and the point, (b) the pre-determined relative position difference between the reference point and the at least one sensor, and (c) the at least one of the position of the reference point of the surface measurement apparatus or the calculated distance between the position measurement station and the reference point of the surface measurement apparatus.

2. The surface measurement apparatus of claim 1, wherein the at least one sensor is a non-contact sensor.

3. The surface measurement apparatus of claim 2, wherein the non-contact sensor is at least one of a sonic sensor, a laser sensor, or a camera.

4. The surface measurement apparatus of claim 1, wherein the at least one sensor is a contact sensor.

5. The surface measurement apparatus of claim 1, further including a display to display at least one of (a) the measured distance between the at least one sensor and the point, (b) the pre-determined relative position difference between the reference point and the at least one sensor, (c) the at least one of the position of the reference point of the surface measurement apparatus or the calculated distance between the position measurement station and the reference point of the surface measurement apparatus, and (d) the absolute position of the point on the surface.

6. A method for obtaining absolute positional information for a surface, comprising:
   measuring a distance, via a sensor of a surface measurement apparatus, between the sensor of the surface measurement apparatus and a point on a surface over which the surface measurement apparatus is configured to travel;
   measuring a position of a reference point on the surface measurement apparatus via a position measurement station having pre-determined real world coordinates, the reference point having a pre-determined relative position difference on the surface measurement apparatus from the sensor; and
   deriving an absolute position of the point on the surface based on (a) the measured distance between the sensor and the point on the surface, (b) the pre-determined relative position difference between the reference point and the sensor, and (c) the measured position of the reference point on the surface measurement apparatus.

7. The method of claim 6, wherein the sensor is a non-contact sensor.

8. The method of claim 7, wherein the non-contact sensor is at least one of a sonic sensor, a laser sensor, or a camera.

9. The method of claim 6, wherein the sensor is a contact sensor.

10. The method of claim 6, further including:

displaying at least one of (a) the measured distance between the at least one sensor and the point, (b) the pre-determined relative position difference between the reference point and the at least one sensor, (c) the measured position of the reference point on the surface measurement apparatus, and (d) the absolute position of the point on the surface.

11. A system, comprising:

a surface measurement apparatus, the surface measurement apparatus including:

at least one sensor for measuring a distance between the at least one sensor and a point on a surface over which the surface measurement apparatus is configured to travel; and a reference point, the reference point having a pre-determined relative position difference on the surface measurement apparatus from the at least one sensor;

a position measurement station having pre-determined real world coordinates, the position measurement station including:

a sensor configured to measure a position of the reference point of the surface measurement apparatus; and a processor for calculating an absolute position of the point on the surface based on (a) the measured distance between the at least one sensor and the point, (b) the pre-determined relative position difference between the reference point and the at least one sensor, and (c) the measured position of the reference point of the surface measurement apparatus.

12. The system of claim 11, wherein the at least one sensor is a non-contact sensor.

13. The system of claim 12, wherein the non-contact sensor is at least one of a sonic sensor, a laser sensor, or a camera.

14. The system of claim 11, wherein the at least one sensor is a contact sensor.

15. The system of claim 11, further including a display to display at least one of (a) the measured distance between the at least one sensor and the point, (b) the pre-determined relative position difference between the reference point and the at least one sensor, (c) the measured position of the reference point of the surface measurement apparatus, and (d) the absolute position of the point on the surface.

* * * * *